F. C. SCHMITZ.
APPARATUS FOR OXIDIZING GASES.
APPLICATION FILED OCT. 21, 1914.
1,242,988.
Patented Oct. 16, 1917.
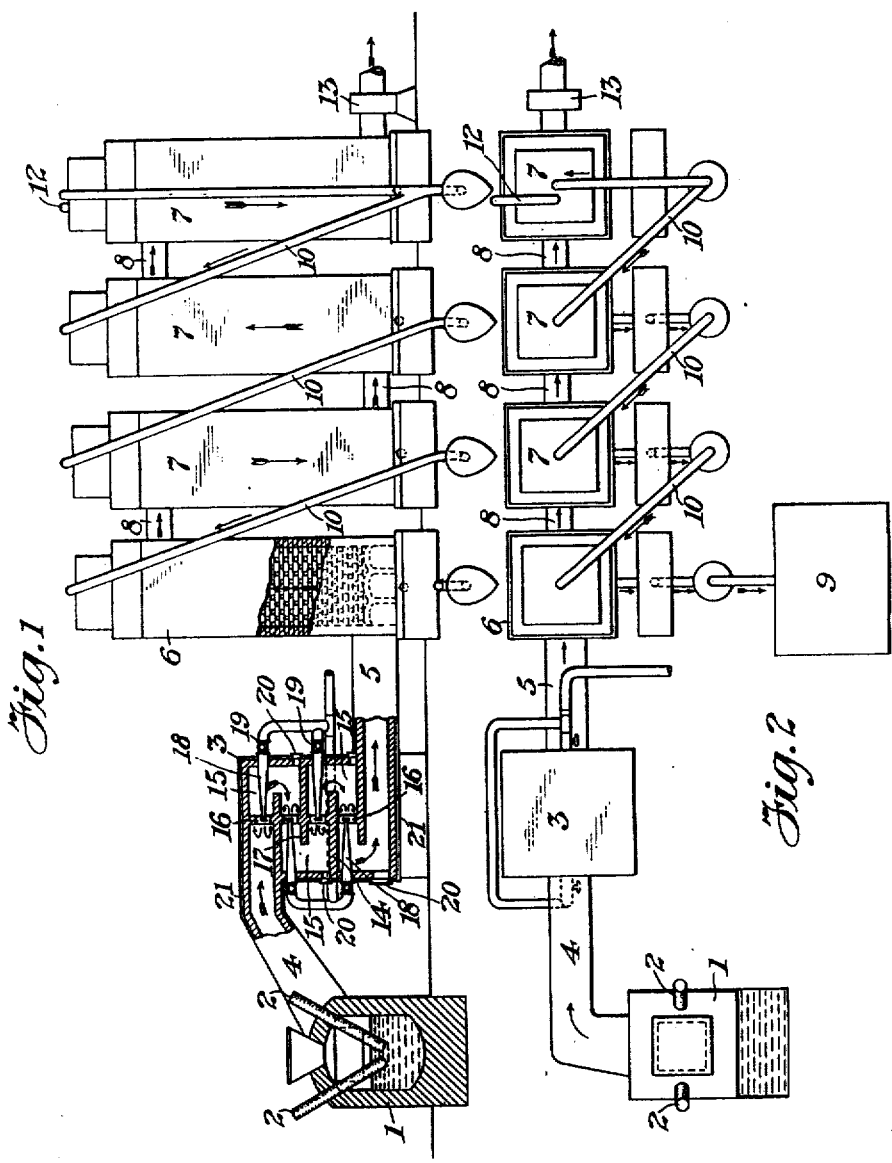
WITNESSES
INVENTOR
Frank C. Schmitz
BY
ATTORNEYS

UNITED STATES PATENT OFFICE.

FRANK C. SCHMITZ, OF NEW YORK, N. Y.

APPARATUS FOR OXIDIZING GASES.

1,242,988.   Specification of Letters Patent.   Patented Oct. 16, 1917.

Original application filed January 22, 1914, Serial No. 813,701. Divided and this application filed October 21, 1914. Serial No. 867,765.

*To all whom it may concern:*

Be it known that I, FRANK C. SCHMITZ, a citizen of the United States, residing at New York, in the county of New York and State of New York, have invented new and useful Improvements in Apparatus for Oxidizing Gases, of which the following is a specification.

My present application is a division of my copending application Serial No. 813,701, filed Jan. 22nd, 1914, for improvements in this art, and the present invention, broadly considered, relates to an improved apparatus for oxidizing certain gases, such for instance as phosphorus, in the prduction of phosphorus pentoxid, oxidation of the gases being accomplished by thoroughly intermixing with the phosphorus or other gases to be oxidized, oxygen either in its pure form; oxygen mechanically mixed with other gases, as nitrogen, in the form of air; or oxygen bearing chemical combinations suitable for the purpose.

My improved apparatus, one type of which is herein shown and described, has proved to be especially and peculiarly efficient in the manufacturing of phosphoric acid from phosphatic material in an electric furnace, and I have therefore, elected to show and describe the apparatus in this connection, although I do not wish to be understood as specifically limiting the invention to this particular manufacture as I am aware that it is equally valuable in treating others than phosphorus gases.

The process carried out in my apparatus consists in subjecting a current of the gases to be oxidized to the action or actions of a current or currents flowing in the opposing direction of oxygen either in its pure form; in the form of atmospheric air, or in the form of oxygen-bearing chemical combinations suitable for the purpose. The opposing current preferably moves in a directly opposite direction to that of the gases. The said gases are preferably subjected to successive actions of opposing currents while passing through a plurality of chambers connected one with the other through the medium of restricted passages or orifices, the said chambers preferably being arranged so that the gases are caused to travel in a tortuous path, (although this arrangement is not absolutely necessary) and the opposing currents act upon the gases as they travel through the restricted passage or passages. These successive actions of the opposing currents serve to thoroughly intermix the gases and oxygen so that complete oxidation results before the gases pass out of the chamber into the concentration and absorption system or apparatus, as for example in the manufacture of phosphoric acid.

In order to enable others to understand and employ my said improved apparatus, I have shown and will describe the same associated with a plant for the manufacture of phosphoric acid.

In the accompanying drawing,

Figure 1 is a front elevation partly in section showing the essentials of a phosphoric acid plant, the several apparatus constituting such a plant being illustrated somewhat conventionally, and embodied in the plant is shown one form of my novel oxidizing chamber constructed for carrying out my improved process, this showing however is only illustrative, and is not to be considered as restrictive.

Fig. 2 is a top plan view of the plant shown in Fig. 1.

In the said drawing the reference numeral 1 designates an electric furnace of any approved construction through the top wall of which the carbon or other electrodes 2, project or extend into the furnace chamber wherein the phosphatic material, such as phosphate rock, silica and carbon is placed. The reference numeral 3 designates the oxidizing chamber presently to be described in detail into which chamber the gases to be oxidized pass from the furnace through the connecting flue 4. From the oxidizing chamber 3, the oxidized gases pass by means of the flue 5, into the concentrating tower 6, of any approved construction such for instance as a Glover tower, and from thence they pass into the absorption tower or towers 7, through suitable connecting flues 8. There may be one, two or more absorption towers as may be desired to suit the conditions of manufacture, the gases passing successively through the several absorption towers.

The gases pass from the oxidizing chamber 3 into the concentrating tower 6, at a temperature of about 2300 degrees F., and are here acted upon by a spray or shower of dilute phosphoric acid pumped from the next succeeding or first absorption tower which concentrates the said acid to about a 50% strength, the said acid leaving the bottom of the tower and passing into a suitable storage tank or receptacle 9, Fig. 2.

The weaker gases leaving the concentrating tower 6, pass successively into the several absorption towers 7, in each of which they are acted upon by a spray of dilute phosphoric acid collected at the bottom of each of said towers, the collected acid from one tower being pumped through pipes 10, into the tower ahead so that the gases in each successive tower are sprayed with acids of different strength, the stronger acid from the first tower of the system being pumped directly into the concentrating tower 6, and the weaker acid from the last tower being pumped into the next to the last tower. Usually water is sprayed through a pipe 12, into the last tower of the system, when the operation is started, but after the operation has been carried on for a sufficient length of time, the weak acid from the last or from any other of the towers may be sprayed into the last tower. I prefer to connect a suction fan 13, to the last tower to assist in drawing the gases through the several towers.

It is a well known fact that when a suitable mixture of phosphate rock, silica, and carbon is introduced into a properly constructed air tight electric furnace, and an alternating current of electricity is discharged through the mass, phosphorus together with other products in gaseous form pass out of the furnace and may be collected in proper apparatus, calcium silicate remaining in the furnace as a slag.

The formula for the principal part of the reaction taking place in the furnace is as follows:

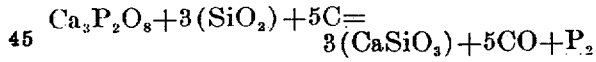
$$Ca_3P_2O_8 + 3(SiO_2) + 5C = 3(CaSiO_3) + 5CO + P_2$$

The gaseous products of this reaction are carried from the reaction zone of the furnace to a retort or chamber into which oxygen is admitted, and there oxidized into carbon dioxid ($CO_2$) and phosphorus pentoxid ($P_2O_5$), according to the formulæ

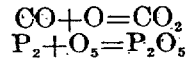
$$CO + O = CO_2$$
$$P_2 + O_5 = P_2O_5$$

While it is probably true that some carbon dioxid ($CO_2$) is produced in the furnace and some oxidized phosphorus is also produced, the latter in one or more forms, the reaction in the main is as above described. The formation of phosphorus pentoxid in the electric furnace itself is not commercially practicable because of the destructive action of oxygen on the electrodes, and because of the difficulty in obtaining a perfect union or mixture between the phosphorus and the oxygen under furnace conditions.

The oxidizing chamber may be constructed as a part of the furnace, as in the form of a stack, shaft or flue, through which the ore is or is not fed into the reaction zone, or it may preferably be a separate chamber of suitable design connected to the furnace, where oxygen in proper amount may be intimately mingled with the gaseous products of the furnace reaction to insure the above mentioned oxidizing reactions.

In the present embodiment of the invention I have shown the oxidizing chamber as consisting of a relatively large chamber 3, divided by means of suitably arranged partitions 14, into a plurality of sub-chambers 15, communicating one with the other by means of constricted openings 16, formed in the said partitions 14, the said sub-chambers preferably being further provided with longitudinally extending baffle-walls 17. The sub-chambers with their baffle-walls are so arranged that the gases being oxidized are caused to travel in a tortuous path as indicated by the arrows in Fig. 1.

The means for subjecting the gases to the action of opposing currents of oxygen or oxygen-bearing chemical combinations, consists of a series of spray nozzles 18, or other devices so arranged as to direct the oxygen to flow under pressure in opposition to the flow of the gases to be oxidized, and by preference I locate the said nozzles on the center line of the constricted openings 16, or at the point or points where the gases flow from one sub-chamber to the other thus insuring a thorough mixture of the gases and oxygen. The combined gases flow from one sub-chamber to another and in their tortuous passage are subjected to successive opposing currents of oxygen. The gases are permitted to successively expand during oxidation as they pass through the several sub-chambers, and these successive expansions taken in connection with the successive actions of the opposing currents serve to thoroughly break up and intermix the gases and oxygen and thus bring about complete oxidation.

The supply of oxygen passing through the several nozzles 18, may be regulated by suitable valves 19, to suit the conditions of operation.

The oxidizing chamber 3, including the several sub-chambers thereof is provided at appropriate places with suitable man-holes 20, for the removal of any precipitates, dust, dirt, etc. that may either be carried into the chamber with the gases and deposited or that may be produced in the chamber by precipitation due to chemical action, also for purposes of examination of the interior of the chamber.

Obviously the entire interior of the chamber as well as its equipment should be made of materials resistant to the actions taking place therein, such materials depending upon the operations carried on within the chamber. Also the chamber should be incased in as nearly an air-tight cover as possible; for example, a riveted steel shell 21, through which the oxygen pipes pass in an air-tight joint.

Briefly stated, the oxidizing apparatus consists preferably of a large chamber in which there are a series of orifices with means for feeding the oxygen thereinto in a direction opposite to the flow of the gases to be oxidized, and sub-chambers of larger cross-sectional area, arranged alternately and in sufficient number to produce complete oxidization of the gases admitted for the purpose, and complete combustion of the admitted oxygen.

In the foregoing specification and in the appended claims the term "oxygen" is employed in the broad meaning of the word and includes oxygen in its pure form; oxygen mechanically mixed with other gases, as nitrogen in the form of air, or oxygen bearing chemical combinations suitable for the purpose.

While I have referred specifically to oxidizing phosphorus, my improved apparatus is equally adapted to the oxidization of other gases, such for instance, as carbon monoxid, phosphorus oxid, sulfur dioxid and others.

What I claim is:—

1. An apparatus for oxidizing gases comprising a chamber having an inlet and an outlet for the gases to be oxidized, and means associated with the chamber and so positioned as to direct a current of oxygen in opposition to the flow of the gases through the chamber.

2. An apparatus for oxidizing gases consisting of a chamber having a gas inlet and gas outlet, said chamber being divided by means of partitions into sub-chambers having communication one with the other by means of constricted openings formed in the said partitions, and means for directing opposing currents of oxygen into the said sub-chambers.

3. An apparatus for oxidizing gases, comprising a chamber having an inlet and an outlet for the gases to be oxidized, a partition in the said chamber dividing the latter into a plurality of sub-chambers, said partition having constricted openings so that the several sub-chambers communicate one with another, and nozzles for directing opposing currents of oxygen into the sub-chambers in opposition to the path of flow of the gases therethrough.

4. An apparatus for oxidizing gases comprising a chamber having a tortuous passage, and an inlet and outlet for the gases to be oxidized, and means for directing successive opposing currents of oxygen in the said tortuous passage in direct opposition to the path of flow of the gases through the passage.

5. An apparatus for manufacturing phosphoric acid, comprising an electric furnace, an oxidizing chamber having a flue-connection with said furnace, a concentrating tower having a flue-connection with said chamber, means for subjecting the furnace gases passing through the chamber to the action of an opposing current of oxygen, an absorption tower having a flue-connection with the said concentrating tower, means for causing a liquid spray to commingle with the gases in the absorption tower, and means for leading the condensate from the absorption tower into the concentrating tower to act upon the gases flowing therethrough.

6. An apparatus for manufacturing phosphoric acid, comprising an electric furnace, an oxidizing chamber having a flue connection with said furnace, a concentrating tower, a flue connection between the said chamber and the lower portion of the tower, and means for directing a current of oxygen into the oxidizing chamber to break up and oxidize the vapors coming from the furnace.

7. An apparatus for manufacturing phosphoric acid, comprising an electric furnace, an oxidizing chamber having a flue connection with said furnace, a concentrating tower, a flue leading from the said chamber to the lower portion of the said tower, and means for directing a current of oxygen into the oxidizing chamber in a direction opposed to the direction of flow of the furnace gases to oxidize and break up such gases before they enter the concentrating tower.

8. An apparatus for manufacturing phosphoric acid, comprising an electric furnace, an oxidizing chamber, a flue connection between the furnace and said chamber, an absorption tower having communication with the said chamber, means for delivering a current of oxygen into the oxidizing chamber and in a direction opposed to the direction of flow of the gases entering the chamber from the furnace to break up and oxidize said gases, and baffle walls in said chamber for causing the gases to flow in a tortuous path and to more thoroughly break up and oxidize such gases before they enter the absorption tower.

In testimony whereof I have hereunto set my hand in presence of two subscribing witnesses.

FRANK C. SCHMITZ.

Witnesses:
CHAS. T. BRYAN,
THOMAS J. SHEEHAN.